Dec. 19, 1967   G. H. JANSON   3,358,798
MAGNETIC PARTICLE CLUTCH
Filed Oct. 22, 1965
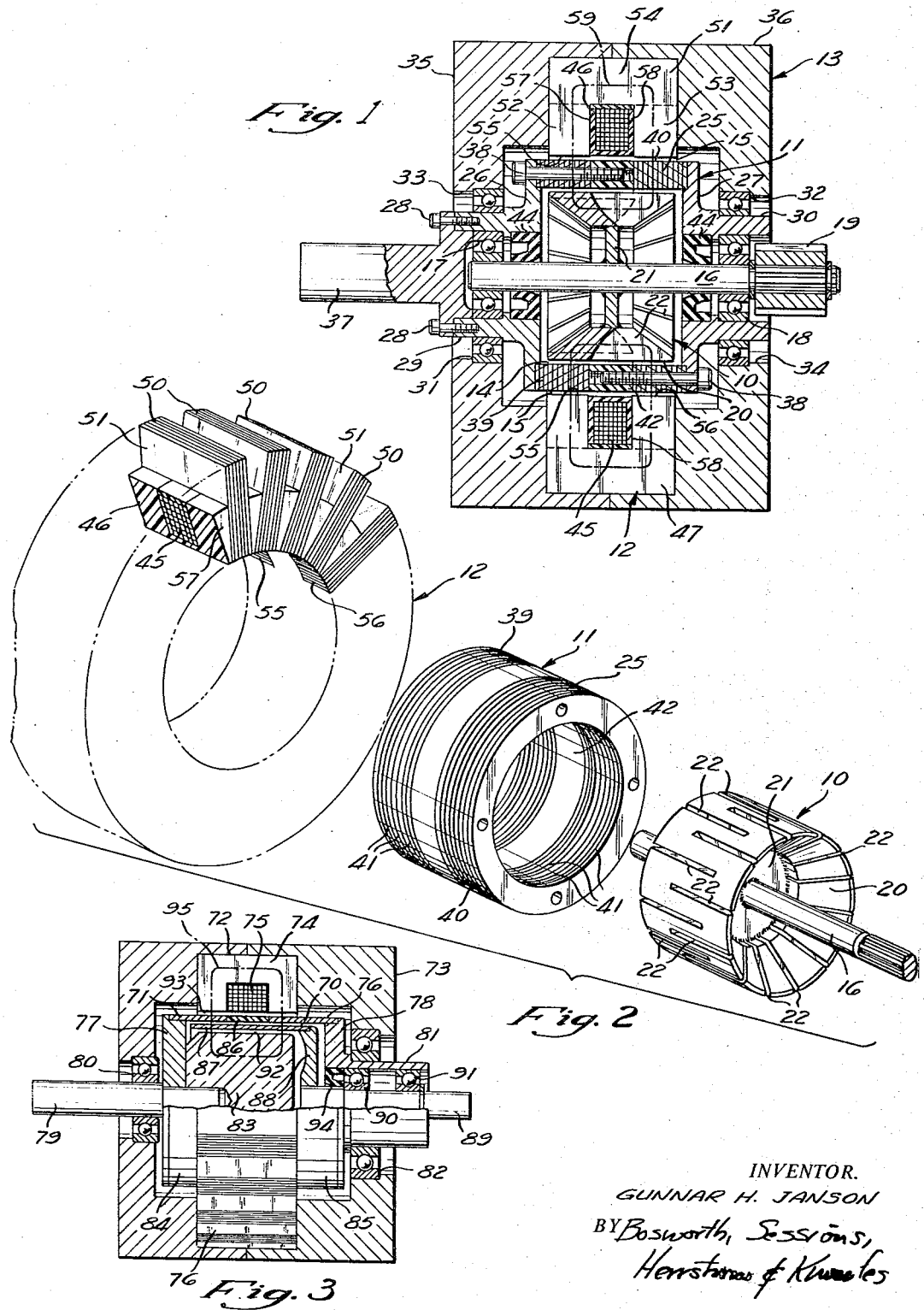
INVENTOR.
GUNNAR H. JANSON
BY Bosworth, Sessions,
Herrstrom & Knowles
ATTORNEYS

United States Patent Office 3,358,798
Patented Dec. 19, 1967

3,358,798
MAGNETIC PARTICLE CLUTCH
Gunnar H. Janson, Aurora, Ohio, assignor to Lear Siegler, Inc., Santa Monica, Calif., a corporation of Delaware
Filed Oct. 22, 1965, Ser. No. 501,384
8 Claims. (Cl. 192—21.5)

ABSTRACT OF THE DISCLOSURE

A coupling including rotatable internested inner and outer members with magnetic particles therebetween and encircled by an electromagnet constructed to be energized by high frequency current. The magnet and outer coupling member may include laminated magnetic plates. The inner coupling member may be slotted and secured to a shaft by a non-magnetic web.

---

This invention relates to magnetic coupling devices and particularly to magnetic coupling devices of the magnetic particle type in which torque is transmitted by a magnetic field linking two relatively rotating coupling elements having an air gap therebetween in which are present magnetic particles.

The amount of torque transmitted depends, among other things, upon the strength of the magnetic field linking the relatively rotatable parts and the magnetic particles in the air gap between them. The amount of torque transmitted may be varied by varying the strength of the magnetic field.

The magnetic field in coupling devices of the type to which this invention relates and, in particular, in a magnetic particle clutch, is conventionally provided by an electrical magnetizing coil adapted to be supplied by a direct current source. Simply, when the coil is de-energized, the clutch elements are decoupled and no power is transmitted. When the coil is fully energized, the clutch plates are coupled and full torque is transmitted.

One of the important problems involved in the operation of a magnetic clutch is the speed of response, e.g. the speed with which the torque-transmitting condition of the clutch may be changed in correspondence to a change in the magnetizing current. The response speed is limited generally by the speed at which the magnetic field can be built up or reduced. Magnetic coupling devices are conventionally built with a solid core structure of magnetizable material and an electrical magnetizing coil. Magnetic fields established in solid core structures, however, usually cannot follow changes in the magnetizing current producing them at frequencies above about a few cycles per second and, therefore, such coupling devices have a limited speed of response. The speed of response is limited by the speed and depth or rate of penetration of the solid core material by the changing magnetic field. Slow and/or shallow penetration of the solid core by the magnetic field, in turn, results from eddy currents induced in the magnetic core and which oppose the magnetizing currents in their magnetizing effects.

It is well known that eddy currents can be minimized by laminating the core structure and thereby limit and reduce the extent of the circulating paths for such currents. Preferably, the laminations are formed of current-limiting, high-resistance, magnetizable material and are insulated from each other. Electric motors commonly have laminated stator and/or rotor core structures.

Known magnetic clutch designs using laminated core structures are limited to cores built up in a cylindrical fashion of annular laminations shaped to provide a number of circumferentially spaced pole faces. The electrical coil windings are arranged to magnetize circumferentially adjacent poles oppositely. Such a core structure is similar to that of an induction motor with north and south pole faces located alternately around the circumference of the core. The paths of the flux between the adjacent pole faces of opposite polarity extend circumferentially of the cylindrical structure. While eddy current losses are reduced by laminating the core, other problems result. The circumferentially extending gaps between adjacent and opposite polarity poles do not readily lend themselves to strong, low-leakage flux fields between a pair of radially adjacent coupling elements or clutch plates and the magnetic particle air gap between them. Also, when a clutch having a circumferential gap is operated with its axis vertical, the magnetic particles tend to settle in the lower end of the clutch rotor and complete the magnetic path between circumferentially adjacent opposite poles and provide a low reluctance flux path and drag losses.

An object of this invention, therefore, is to provide a magnetic particle clutch having a high speed of response; magnetic flux paths or patterns and related air gap and magnetic particle chamber configurations which tend to prevent the packing of the magnetic particles in the air gaps between the relatively rotatable members; and magnetic flux-producing structures arranged to combat the diminution of flux path reductance between opposite field poles resulting from settled magnetic particle accumulations in the clutch, especially when the coupling device is operated with its axis vertical. Another object is to provide such a magnetic particle clutch that is easy and economical to manufacture and yet is highly efficient and useful.

Briefly, this invention comprehends a clutch having a stationary annular magnetic core structure and magnetizing coil encircling coaxial and relatively rotatable driving and driven clutch elements having cylindrical air gap or gaps therebetween in which are confined magnetic particles. The annular magnetic core structure, and preferably that one of the two relatively rotatable clutch members radially adjacent to it, is laminated, reducing eddy current losses. As a result, the speed and depth of flux field penetration of the core structure and elements comprising the magnetic flux path are improved and, with it, the speed of response of the clutch. In addition, the laminated annular core structure is so arranged as to produce axially extending air gaps and axially spaced cylindrical pole faces of opposite polarity against the possibility of accumulations of magnetic particles in one end of the clutch, reducing the reluctance of the magnetic flux path between opposite polarity poles in the field structure, especially when the clutch is operated with its axis in a vertical position. In addition, the radially inner rotating member is slotted, permitting increased paths of movement and circulation for the magnetic particles confined around about it which tends to reduce any tendency of the particles to settle or be packed by slight eccentricities in the rotating members in the air gap or gaps and against the adjacent surfaces of the relatively rotatable members.

The objects mentioned above, together with other features and advantages of this invention, will be apparent from the following description of two embodiments of it taken together with the accompanying drawings in which:

FIGURE 1 is an axial cross section of one embodiment;

FIGURE 2 is an exploded perspective view of the major magnetic parts of the clutch shown in FIGURE 1; and FIGURE 3 is an axial cross section of a second embodiment.

The embodiment of this invention shown in FIGURES 1 and 2 comprises an output or driven member 10 mounted coaxially of and for relative rotation with an input or driving member 11. The output and input members 10 and 11 are encircled by an annular magnetic field structure 12 that is mounted in stationary, two-part housing 13. There is an inner cylindrical air gap 14 between rotating members 10 and 11 and an outer cylindrical air gap 15 between rotating member 11 and stationary field structure 12.

Output or driven member 10 consists of an output shaft 16 mounted for rotation in axially spaced bearings 17 and 18 and extending out one side of housing 13. The exposed end of the shaft is splined and may be fitted with torque-transmitting means such as pinion 19. A generally cylindrical magnetic drum 20 is supported at a point remote from its ends coaxially of and fixedly mounted to output shaft 16 at a point thereon axially between bearings 17 and 18 by radially extending web 21 of nonmagnetic material. Output drum 20 is preferably heaviest in section in its axially central region which is attached as by welding to support web 21 of stainless steel. Drum 20 tapers to radially lighter sections axially outwardly from the web. As seen in FIGURE 1, the cross section of output drum 20 is generally trapezoidal. Drum 20 is provided with circumferentially spaced radial slots 22 extending axially from the two axial ends of the drum toward central web 21. As will become clear from the description that follows, slots 22 in output drum 20 provide paths for movement and promote the circulation above of the magnetic particles contained in the clutch.

Input or driving member 11 consists of a hollow cylindrical drum 25 surrounding and supported coaxially of output drum 20 by a pair of end bells 26 and 27 of aluminum or other non-magnetic material attached as by bolts 28 to the axially opposite ends of drum 25. Non-magnetic end bells 26 and 27 have hollow cylindrical axial extensions 29 and 30, respectively. Bearing 17 is mounted inside cylindrical extension 29 and bearing 18 is mounted inside cylindrical extension 30, permitting output of driven member 10 to rotate inside input drum 25 and end bells 26 and 27. Cylindrical axial extensions 29 and 30 on the two end bells of the input assembly are fitted inside bearings 31 and 32, respectively, and are, in turn, supported by shouldered openings 33 and 34 in housing parts 35 and 36, respectively, permitting input or driving member assembly to rotate relative to and within housing 13. Power is put into driving member assembly 11 by means of shaft 37 having a flanged end fastened by bolts 38 to end bell 26.

Drum 25 of driving member 11, as shown in FIGURES 1 and 2, comprises a generally thin-walled cylinder having axial lengths or end portions 39 and 40 made up of axially stacked sets of annular laminations 41. Laminations 41 preferably are formed of high resistance magnetic material such as high silicon-content iron and are electrically insulated from each other. The magnetic end portions 39 and 40 are axially spaced from each other, both physically and magnetically, by a central spacer ring or portion 42 of drum 25 formed of a non-magnetizable material such as glass epoxy laminate. Each set of annular laminations 41 is tack welded at a number of places about its outer periphery to hold the laminations together. The two magnetizable laminated end portions 39 and 40, spacer ring 42, and the two end bells 26 and 27 are all assembled in axial alignment as shown in FIGURE 1 and held together by bolts 28 turned into axially extending tapped bores circumferentially spaced in the spacer ring.

From the foregoing descriptions of the input or driving member assembly and output or driven member, it is seen that the two members are coaxially related and radially spaced apart by cylindrical air gap 14, and, additionally, are relatively rotatable with respect to each other. Further, input member 11 surrounds and contains output member 10 except for the outside extension of its output shaft 16. Input member 11 is supported within housing 13 for rotation about the common axes of the two clutch members 10 and 11. The space inside input drum 25 and between the axially facing ends of end bells 26 and 27 and in which output drum 20 is housed comprises the magnetic particle chamber. The magnetic particles are, for example, fine iron dust which may or may not be suspended in oil or other lubricant. The magnetic particles have not been shown in the drawings in order not to obscure their clarity. The particles are sealed in the space defined above by a pair of non-magnetic annular shaft seals 44 fitted inside end bells 26 and 27 and surrounding output shaft 16.

The magnetizing field structure comprises an annular energizing coil 45 wound on a coil bobbin 46 of non-magnetic, insulating material such as phenolic material, together with a core of magnetic material and indicated generally at 47. The structure is held stationary relative to output and input members 10 and 11 between the parts 35 and 36 of non-magnetic housing 13. Core 47, coil 45, and coil bobbin 46, assembled, encircle and have a common axis with output and input members 10 and 11.

One of the important features of this invention is the diminution of eddy currents in the magnetic core of the field structure and in other elements included in the flux path. In stationary core 47, the magnetic material is provided in short stacks or sets 50 of superposed U-shaped laminations 51 of magnetic material. Sets 50 are circumferentially spaced about coil 45 and coil bobbin 46 and each oriented with their laminations 51 lying in generally radially divided planes. Each of the generally U-shaped laminations 51 has a pair of laterally spaced apart leg portions 52 and 53 joined together at one end by an interconnecting portion 54. The opposite ends 55 and 56 of legs 52 and 53, respectively, are free and extend into and become a part of the two spaced apart pole faces formed by each stacked set 50 of laminations. Sets 50 are positioned astride the outer side of bobbin 46 and over coil 45 wound on it. Legs 52 and 53 of all the laminations 51 making up each set 50 are received by radially directed slots milled in the annular end faces 57 and 58 of bobbin 46 so that core sets 50 are circumferentially spaced about the coil 45 and with their poles facing inwardly toward the center of the annular field structure and with poles comprising each set axially spaced from each other. The axially spaced pole faces of each pair preferably are opposite the laminated and axially spaced end portions of drum 25 and the axial extent of each pole face corresponds to its radially adjacent laminated end portion of drum 25.

The flux path of the embodiment shown in FIGURES 1 and 2 is indicated by single closed broken lines 59 on FIGURE 1 and includes the two legs 52 and 53 and interconnecting portion 54 of U-shaped laminations 51. From the pole face made up of the free ends 55 of laminations 51 of each set 50, the flux extends radially across outer cylindrical air gap 15, into and through magnetic, laminated end portion 39 of coupling member 11, across inner cylindrical air gap 14 containing magnetic particles, and into magnetic drum 20 of coupling member 10. The flux path extends axially of cylindrical drum 20 to a point radially opposite the pole face of the stationary core 47 made up of the free ends 56 of laminations 51. The flux path proceeds radially outwardly from drum 20 to the pole face through inner air gap 14, magnetic, laminated end portion 40 of coupling member 11, and outer cylindrical air gap 15.

The embodiment of this invention shown in FIGURES 1 and 2 and described above exhibits a speed of response several times faster than the speed or response of a similarly dimensioned and energized magnetic clutch having a solid stationary core structure. In addition, the magnetically spaced and isolated and laminated end portions 39 and 40 of the outer coupling member 11 materially contribute to the speed of response and overall efficiency of the device by minimizing eddy currents and leakage flux. It is preferred, as indicated by the drawings, that the flux path be of approximately uniform cross-sectional area throughout its entire circuit. The radial extent of the gaps, and particularly of outer air gap 15 between the annular field structure 12 and outer coupling member 11, should be kept to a minimum.

This invention is not limited to the particular form of stationary field structure 12 shown and described above. The structure 12 could equally well be formed, for example, by using an air "wound" coil of anodized aluminum strip material and sets of U-shaped laminations, all held in a fixture in approximately the same relationship as corresponding elements are held by the bobbin described above and mounted to form an integral stator assembly.

FIGURE 3 shows a modified form of clutch embodying this invention comprising coaxial cylindrical output or driven member 70 and input or driving member 71 mounted for rotation relative to each other and to an encircling annular field structure 72 mounted in a two-part non-magnetic housing 73. Annular field structure 72 is substantially the same as annular field structure 12 of the embodiment shown in FIGURES 1 and 2 and described above and comprises a plurality of sets 74 of stacked U-shaped magnetic laminations circumferentially spaced about an annular energizing coil 75. Lamination sets 74, in a manner similar to sets 50 of the FIGURE 1 device, have axially spaced apart pole faces of opposite polarity directed radially inwardly and in cylindrical arrangement about the inside of annular energizing coil 75.

Outer coupling member 71 in the clutch shown in FIGURE 3 comprises a thin-walled, cylindrical drum 76 supported at its ends by non-magnetic end bells 77 and 78. End bell 77 is joined to shaft 79 appropriately journalled in bearing 80. End bell 78 has an axially tubular extension 81 supported externally for rotation by bearing 82. A solid cylinder 83 of magnetic material is located coaxially of thin-walled cylindrical drum 76 and supported for rotation therewith by and through attachment to end bell 77 and input shaft 79. Magnetic cylinder 83 extends axially across the combined axial extent of both pole faces and the space between them of annular field structure 72. The outer cylindrical surface of magnetic cylinder 83 is relatively closely radially spaced from the inside of thin-walled cylindrical drum 76. Thin-walled cylindrical drum 76 has axial end portions 84 and 85 of magnetic material axially separated and magnetically isolated by a non-magnetic spacer ring 86. The axial extent of spacer ring 86 is preferably such that it corresponds to the axial spacing of the pole faces to the annular field structure and so that the magnetic end portions 84 and 85 of cylinder 76 are radially opposite the full area of the pole faces.

Inner coupling member 70 comprises a cup-like element made up of thin-walled magnetic cylinder 87 and radially extending web 88 of non-magnetic material joined to output shaft 89. Shaft 89 extends axially inside tubular extension 81 of end bell 78 of coupling member 71 and is supported for rotation therein by axially spaced apart bearings 90 and 91. The thin-walled magnetic cylinder 87 of coupling member 70 overhangs the inside end of shaft 89 and web 88 and telescopes into and fits the cylindrical space between the outside of magnetic cylinder 83 and the inside of drum 76 of outer coupling member 71 to form therewith inner and outer magnetic particle air gaps 92 and 93, respectively. Also present in the space between magnetic cylinder 83 and drum 76 are conventional magnetic particles with or without lubricant. A suitable seal 94 is employed to confine the magnetic particles therein.

The flux path in the clutch shown in FIGURE 3 is indicated by broken line 95 and is made up in part, of course, by the U-shape of the laminated U-shaped core structure. The flux path between the axially spaced pole faces of the core structure extends radially from each pole face across the air gap separating the pole face and cylindrical drum 76 of outer coupling member 71, through the magnetic end portions of drum 76, across outer magnetic particle air gap 93, through magnetic cylinder 87, across inner magnetic particle air gap 92, and thence into solid magnetic cylinder 83 which provides an axially extending path joining the two axially spaced radial branches just described. It will be noted that the construction shown and described above provides two concentric cylindrical magnetic particle air gaps for linking and coupling the two coupling members and, because of the increased working area, provides for relatively greater torque transmission between the two members. In addition, the single-ended, cup-shaped design of the inner coupling element 70 would permit control of the extent of the flux-linked area between it and the other coupling member and the stationary field core structure by axial positioning of the member 70 relative to outer coupling member 71 and field structure 72. The thin walls of the magnetic portions of coupling members 70 and 71 reduce any deleterious effect in the speed of response resulting from eddy currents. Also, they may be conveniently formed of tubing material. A further advantage of the clutch shown in FIGURE 3 is that it requires but a single rotating seal for confining the magnetic particles.

Those skilled in the art will appreciate that various other changes and modifications can be made in the preferred form of apparatus described herein without departing from the spirit and scope of the invention.

I claim:
1. A magnetic coupling comprising
  a pair of concentrically related, inner and outer, cylindrical coupling members comprising magnetic material and mounted for rotation relative to the other and having radially outwardly and inwardly facing adjacent cylindrical surfaces respectively, said surfaces being radially opposite and closely spaced from each other to form an axially extending inner cylindrical air gap therebetween,
  magnetic particles in said air gap,
  sealing means having sealing contact with said coupling members for confining said magnetic particles in a space within said radially inwardly facing cylindrical surface of said outer coupling member and containing said inner coupling member and said air gap,
  a magnetizing field structure supported adjacent said outer cylindrical coupling element, said magnetizing structure comprising a magnetic core encircling said outer coupling member and comprising flat, thin, generally U-shaped laminations of magnetic material, each having a pair of laterally spaced apart leg portions joined together at one end by an interconnecting portion and each lying substantially in a radially directed plane containing the axis of said coupling members and arranged in a plurality of circumferentially aligned and spaced sets of laminations stacked together in superposed relationship, said sets each having a magnetically interconnected pair of pole faces radially opposite axially spaced portions of said outer cylindrical coupling member and spaced therefrom by an outer air gap, and a cooperating electrical coil adapted to magnetize said pole faces with opposite polarities and including a circular supporting bobbin of non-magnetic material having oppositely facing and generally parallel annular end faces with axially opposite pairs of radial slots therein for receiving and supporting said sets of magnetic laminations, said sets of U-shaped superposed laminations being positioned astride and supported by the bobbin with said interconnecting portions overlying the outside of said bobbin and said leg portions extending radially therefrom in said radial slots and spaced apart axially of and by said bobbin to form said radially inwardly facing pole faces in cylindrical arrangement,
  said inner and outer cylindrical coupling members together comprising a magnetic flux path between said pole faces.
2. The magnetic coupling according to claim 1 in which said laminations are formed of magnetic material having high electrical resistivity and are electrically insulated from each other.

3. A magnetic coupling comprising a pair of concentrically related, inner and outer, cylindrical coupling members comprising magnetic material and mounted for rotation relative to the other and having radially outwardly and inwardly facing adjacent cylindrical surfaces respectively, said surfaces being radially opposite and closely spaced from each other to form an axially extending inner cylindrical air gap therebetween, said outer coupling member comprising a hollow cylindrical drum having an axial end length adjacent each drum end of magnetizable material and non-magnetizable axial central length between each of said axial end lengths axially spacing them apart and magnetically insulating each from the other and non-magnetizable means supporting said drum for rotation, said inner coupling member comprising a magnetizable, hollow, cylindrically-walled second drum, a shaft mounted for rotation and a non-magnetizable web extending radially from said shaft to said second drum supporting said second drum coaxially of said shaft, magnetic particles in said air gap, sealing means having sealing contact with said coupling members for confining said magnetic particles in a space within said radially inwardly facing cylindrical surface of said outer coupling member and containing said inner coupling member and said air gap, a magnetizing field structure supported adjacent said outer cylindrical coupling element and permitting its rotation relative thereto, said magnetizing structure comprising a magnetic core comprising a plurality of flat thin laminations of magnetic material each lying substantially in a radially directed plane containing the axis of said coupling members and having a magnetically interconnected pair of pole faces radially opposite axially spaced portions of said outer cylindrical coupling member and spaced therefrom by an outer air gap, and a cooperating electrical coil adapted to magnetize said pole faces with opposite polarities, said inner and outer cylindrical coupling members together completing a magnetic flux path between said pole faces.

4. The magnetic coupling according to claim 3 in which said hollow cylindrically-walled drum of said inner coupling member is provided with circumferentially spaced, axially extending radial slots for communication between the inside and outside of the drum through the wall thereof.

5. A magnetic coupling comprising a pair of concentrically related, inner and outer, cylindrical coupling members comprising magnetic material and mounted for rotation relative to the other and having radially outwardly and inwardly facing adjacent cylindrical surfaces respectively, said surfaces being radially opposite and closely spaced from each other to form an axially extending inner cylindrical air gap therebetween, said inner coupling member comprising a magnetizable, hollow, cylindrically-walled drum, a shaft mounted for rotation, and a non-magnetizable web extending radially from said shaft and connected to said drum and supporting said drum coaxially of said shaft, said outer coupling member comprising inner and outer concentric cylindrical elements of greater and smaller diameter than the outside and inside diameters respectively of said cylindrically-walled drum of said inner coupling member, and a non-magnetizable ring separating and supporting said cylindrical elements remote from one end thereof, said inner and outer cylindrical elements of said outer coupling member and said cylindrically-walled drum of said inner coupling member being concentric and axially telescoped so that adjacent surfaces of the two members are radially opposite and spaced to form an outer cylindrical air gap between said outer cylindrical element and said drum of said outer and inner coupling members respectively and an inner cylindrical air gap between said drum and said inner cylindrical element of said inner and outer coupling members respectively and magnetic particles in both of said air gaps, sealing means having sealing contact with said coupling members for confining said magnetic particles in a space within said radially inwardly facing cylindrical surface of said outer coupling member and containing said inner coupling member and said air gap, a magnetizing field structure supported adjacent said outer cylindrical coupling element, said magnetizing structure comprising a magnetic core having a magnetically interconnected pair of pole faces radially opposite axially spaced portions of said outer cylindrical coupling member and spaced therefrom by an outer air gap, said magnetic core comprising a plurality of thin flat laminations of magnetic material each lying substantially in a radially directed plane containing the axis of said coupling members, said inner and outer cylindrical coupling members together completing a magnetic flux path between said pole faces.

6. The coupling according to claim 5 in which said magnetic core encircles said outer coupling members.

7. The magnetic coupling according to claim 6 in which said magnetic core comprises a plurality of circumferentially aligned and spaced sets of said magnetic laminations stacked together in superposed relationship.

8. The coupling according to claim 7 in which each of said laminations is generally U-shaped having a pair of laterally spaced apart leg portions joined together at one end by an interconnecting portion and extending therefrom into said pole faces.

References Cited

UNITED STATES PATENTS

| | | | |
|---|---|---|---|
| 2,663,809 | 12/1953 | Winslow | 192—21.5 X |
| 2,673,631 | 3/1954 | Gold | 192—21.5 |
| 2,684,138 | 7/1954 | Buckman | 192—21 |
| 2,702,016 | 2/1955 | Reece | 192—21 X |
| 2,987,153 | 6/1961 | Perry | 192—21 |
| 2,990,042 | 6/1961 | Jaeschke | 192—21 |
| 3,266,606 | 8/1966 | Barrett | 192—21 |

BENJAMIN W. WYCHE, III, *Primary Examiner.*